E. A. OLLEY.
CONDUIT OUTLET BOX.
APPLICATION FILED MAY 25, 1911.
1,228,127.
Patented May 29, 1917.
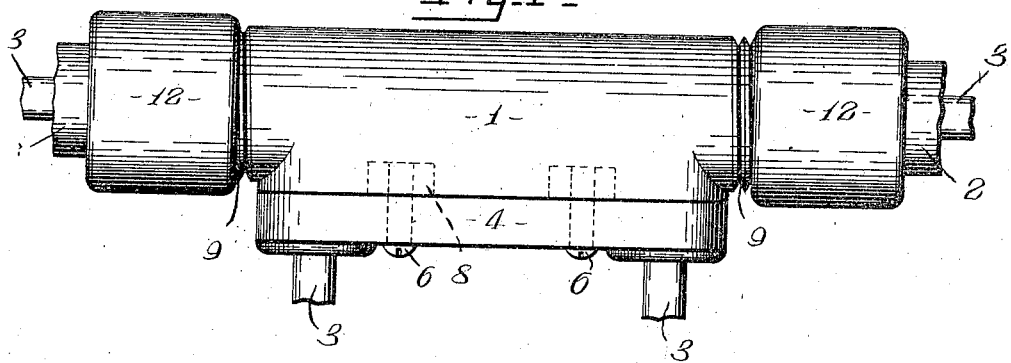
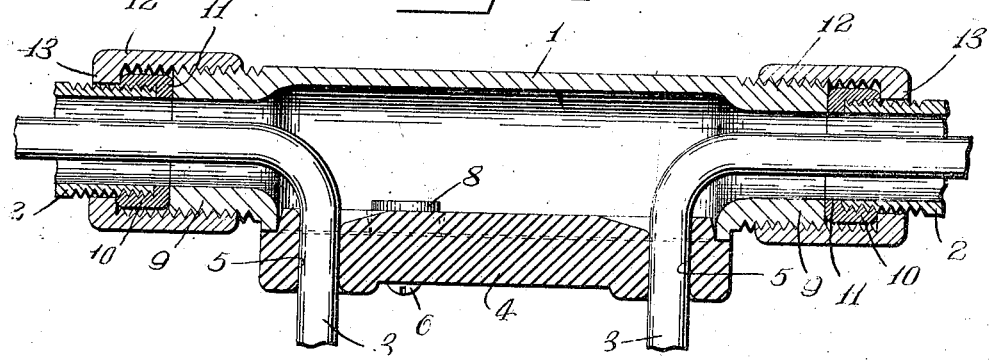
WITNESSES:
INVENTOR

UNITED STATES PATENT OFFICE.

EDWIN A. OLLEY, OF SYRACUSE, NEW YORK, ASSIGNOR TO CROUSE-HINDS COMPANY, OF SYRACUSE, NEW YORK, A CORPORATION OF NEW YORK.

CONDUIT OUTLET-BOX.

1,228,127.  Specification of Letters Patent.  Patented May 29, 1917.

Application filed May 25, 1911. Serial No. 629,250.

*To all whom it may concern:*

Be it known that I, EDWIN A. OLLEY, of Syracuse, in the county of Onondaga, in the State of New York, have invented a certain new and useful Conduit Outlet-Box, of which the following is a specification.

This invention relates to outlet boxes for electric conduits and particularly to means for coupling such boxes to the conduits without turning the boxes or the conduits, and the invention consists in the combinations and constructions hereinafter set forth and claimed.

In describing this invention reference is had to the accompanying drawing in which like characters designate corresponding parts in all the views.

Figure 1 is an elevation of this outlet box and means for coupling the same to the contiguous sections of electric conduit.

Fig. 2 is a longitudinal sectional view of parts seen in Fig. 1.

1 is the outlet box. 2 are electric conduit sections to which the outlet boxes may be secured, such sections inclosing the wires 3 which have an outlet through the box 1.

The box 1 is provided with an opening in one of its longitudinal sides, and such opening is covered by a suitable closure 4, usually formed of insulation and having openings 5 at its ends for the outlet of the wires 3, the closure being detachably secured in position by screws 6 passing through openings in the closure and threading into lugs 8 on the inner face of the box 1.

The conduit sections 2 are connected to the outlet box by suitable means having clamping members movable in a direction axially of the conduit, and in the illustrated embodiment of my invention the box is provided with externally threaded nipples 9 usually arranged at the opposite ends of the box and in axial alinement, said nipples 9 being adapted to be brought into position in alinement with the conduit sections 2, so that the end faces of the nipples 9 and the sections 2 are opposed to and spaced apart from each other. One of each pair of the alined parts 2, 9 is preferably of larger diameter than the other, and a detachable cup-shaped member having an opening in its bottom is threaded on the part of less diameter, the bottom forming a peripheral shoulder on such part of less diameter, and said parts are coupled together by a second member as a sleeve threading on the part of larger diameter and having an inturned flange coacting with the ring during the turning of the sleeve into operative position.

In the illustrated embodiment of my invention each nipple 9 is of larger diameter than the conduit section 2 to which it is coupled, and a ring 10 threads onto the threaded end of each conduit section 2 forming the peripheral shoulder, the ring 10 being also formed with an inturned flange 11 which is interposed between the opposing end faces of the contiguous nipple 9 and the corresponding conduit section 2 the internal faces of the nipple 9, inturned flange 11 and conduit 2 being substantially flush; and a coupling sleeve 12 threads on each nipple 9 and is provided with an inturned annular flange 13 at one end which engages the contiguous ring 10 during the turning of the sleeve onto the nipple 9 and tightly couples the nipple to the corresponding conduit section 2. In furnishing the boxes to the trade the coupling sleeves are supplied therewith and the sleeves are threaded on the nipples, and the rings for turning on the conduit are contained within the sleeves. Thus the outlet box is provided with means carried thereby for attaching said box to a conduit and the box can be connected to the conduit sections without turning the box or the conduit sections or changing the relative positions of the conduit or the box.

What I claim is:

The combination of an electric conduit having an externally threaded end, an outlet box having an integral nipple externally threaded and of greater diameter than the conduit, said conduit and nipple having bores of substantially the same diameter, a cup-shaped member having an opening through the bottom thereof of approximately the diameter of said bores, the outer face of the bottom of said member abutting against the end of the nipple, the inner face of the bottom of said member abutting against the end of the conduit, and the inner peripheral wall of the member being threaded for engagement with the external threads of the conduit, and a second member internally threaded for engaging the threads of the nipple and provided at its outer end with a flange, the inner face of which abuts against the edge of the first-named member opposite to the bottom thereof, substantially as and for the purpose described.

In testimony whereof, I have hereunto signed my name in the presence of two attesting witnesses, at Syracuse, in the county of Onondaga, in the State of New York, this 18th day of May 1911.

EDWIN A. OLLEY.

Witnesses:
WM. CORNELL BLANDING,
C. C. SCHOENECK.